US008767097B2

(12) United States Patent
Koh

(10) Patent No.: US 8,767,097 B2
(45) Date of Patent: Jul. 1, 2014

(54) IMAGE CAPTURING DEVICE AND LENS ACTUATING DEVICE AND LENS ACTUATING METHOD THEREOF

(75) Inventor: Hong-Bin Koh, New Taipei (TW)

(73) Assignee: Altek Corporation, Hsinchu (TW)

( * ) Notice: Subject to any disclaimer, the term of this patent is extended or adjusted under 35 U.S.C. 154(b) by 245 days.

(21) Appl. No.: 13/538,260

(22) Filed: Jun. 29, 2012

(65) Prior Publication Data
US 2013/0242162 A1    Sep. 19, 2013

(30) Foreign Application Priority Data

Mar. 19, 2012  (TW) .............................. 101109402 A

(51) Int. Cl.
  *H04N 5/262*   (2006.01)
  *H04N 5/228*   (2006.01)
  *G02B 13/16*   (2006.01)
  *H04N 5/225*   (2006.01)
  *G03B 13/00*   (2006.01)
  *H04N 5/232*   (2006.01)
  *G03B 17/00*   (2006.01)

(52) U.S. Cl.
USPC ............. 348/240.3; 348/222.1; 348/240.99; 348/335; 348/345; 348/348; 396/79; 396/85; 396/86

(58) Field of Classification Search
USPC ................ 348/222.1, 335, 340, 345–357; 396/72–88, 133–136
See application file for complete search history.

(56) References Cited

U.S. PATENT DOCUMENTS

| 4,735,494 | A  * | 4/1988 | Makino et al. ............. 359/694 |
| 4,935,763 | A  * | 6/1990 | Itoh et al. ................ 396/81 |
| 5,757,429 | A  * | 5/1998 | Haruki .................... 348/354 |
| 6,856,764 | B2 * | 2/2005 | Higuma .................... 396/79 |
| 8,427,554 | B2 * | 4/2013 | Tsuda ..................... 348/240.1 |
| 8,629,933 | B2 * | 1/2014 | Okamoto et al. ........... 348/356 |
| 2003/0020814 | A1 * | 1/2003 | Ono ................... 348/220.1 |
| 2004/0190887 | A1 * | 9/2004 | Natsume ................. 396/86 |
| 2005/0031332 | A1 * | 2/2005 | Kashiwaba et al. ...... 396/135 |
| 2005/0134709 | A1 * | 6/2005 | Ishii et al. ............. 348/240.99 |
| 2006/0127076 | A1 * | 6/2006 | Kokabu ................. 396/80 |
| 2006/0171699 | A1 * | 8/2006 | Nakai et al. ............ 396/125 |
| 2006/0203118 | A1 * | 9/2006 | Hirai .................. 348/345 |
| 2006/0203119 | A1 * | 9/2006 | Masuda ................ 348/347 |
| 2006/0232698 | A1 * | 10/2006 | Ito et al. .............. 348/345 |
| 2006/0232701 | A1 * | 10/2006 | Ito et al. .............. 348/348 |
| 2007/0285557 | A1 * | 12/2007 | Wu .................... 348/345 |
| 2008/0002960 | A1 * | 1/2008 | Ito et al. .............. 396/125 |
| 2008/0025715 | A1 * | 1/2008 | Ishii .................. 396/105 |
| 2008/0187302 | A1 * | 8/2008 | Okawara ............... 396/80 |
| 2009/0002543 | A1 * | 1/2009 | Tomita et al. .......... 348/345 |

(Continued)

*Primary Examiner* — Michael Osinski
(74) *Attorney, Agent, or Firm* — Muncy, Geissler, Olds & Lowe, P.C.

(57) ABSTRACT

The present invention discloses an image capturing device and a lens actuating device and a lens actuating method thereof. The lens actuating device comprises a focus lens group, a zoom lens group, a motor and a microcontroller. The focus lens group is arranged for changing a focus point of the image. The zoom lens group is arranged for changing distance of the image. The motor is arranged for driving the movements of the focus lens group and the zoom lens group respectively. The microcontroller is arranged for receiving a plurality of instructions, and controlling the motor at one of a plurality of predetermined speeds according to the instruction received to control the motor to drive the focus lens group or the zoom lens group to perform a focus motion or a zoom motion.

10 Claims, 4 Drawing Sheets

(56) References Cited

U.S. PATENT DOCUMENTS

| | | | |
|---|---|---|---|
| 2009/0167897 A1* | 7/2009 | Fujita | 348/240.1 |
| 2010/0128162 A1* | 5/2010 | Tanaka | 348/345 |
| 2010/0141801 A1* | 6/2010 | Okamoto et al. | 348/240.3 |
| 2010/0232775 A1* | 9/2010 | Okamoto et al. | 396/81 |
| 2011/0075275 A1* | 3/2011 | Sugiura | 359/817 |
| 2011/0267706 A1* | 11/2011 | Karasawa | 359/698 |
| 2012/0026386 A1* | 2/2012 | Tomita | 348/345 |
| 2012/0113315 A1* | 5/2012 | Kawanishi | 348/349 |
| 2012/0169917 A1* | 7/2012 | Isobe | 348/345 |
| 2012/0327290 A1* | 12/2012 | Matsuzawa et al. | 348/349 |
| 2013/0120645 A1* | 5/2013 | Uenishi | 348/353 |

* cited by examiner

IMAGE CAPTURING DEVICE AND LENS ACTUATING DEVICE AND LENS ACTUATING METHOD THEREOF

CROSS-REFERENCE TO RELATED APPLICATION

This application claims the benefit of Taiwan Patent Application No. 101109402, filed on Mar. 19, 2012, in the Taiwan Intellectual Property Office, the disclosure of which is incorporated herein in its entirety by reference.

BACKGROUND OF THE INVENTION

1. Field of the Invention

The present invention relates to an image capturing device and a lens actuating device and a lens actuating method thereof, in particular to the image capturing device and the lens actuating device and method thereof that use a microcontroller to control a single motor by different instructions to operate at different rotating speeds for a focus or zoom function.

2. Description of the Related Art

At present, most digital still cameras (DSC) available in the market come with zoom and focus functions which are driven and controlled by a DC motor and a step motor respectively, or by a single step motor. There are not many cameras that use a single DC motor to control both zoom and focus functions in the market.

In order to use two motors comprising a DC motor and a step motor for the zoom and focus controls, two sets of control circuits will be required, and the construction cost of the DSC will be increased, and the DC motor can only be used for controlling a change of speeds for the zooming. When a single step motor is used to achieve the zoom and focus controls, the control of rotating speeds will no longer be a concern and a controller is generally used to issue an instruction to control the zooming and focusing precisely. However, the drop current released from the step motor is higher than that of the DC motor. When both zooming and focusing are controlled by the step motor, the battery of the DSC will be exhausted quickly, such that the camera not only fails to meet maximum number of photos taken requirements, but also fails to comply with the power saving requirements or meet the user requirements. When the single DC motor is used for the zooming and focusing functions and only one rotating speed is used for executing the zoom and focus motions, the efficiency of use is too low.

Therefore, the present invention overcomes the aforementioned problems by using a single motor to control the zoom and focus motions, and controls the rotating speed to improve the overall performance.

SUMMARY OF THE INVENTION

In view of the aforementioned problems of the prior art, it is a primary objective of the present invention to provide an image capturing device and a lens actuating device and a lens actuating method thereof, so that a single motor can use different rotating speeds to perform the zoom and focus functions to improve the overall performance.

To achieve the aforementioned objective, the present invention provides a lens actuating device applied in an image capturing device, comprising: a focus lens group, a zoom lens group, a motor and a microcontroller. The focus lens group is provided, for changing a focal point of an image. The zoom lens group is provided for changing a focal length of an image. The motor is provided for driving the movements of the zoom lens group and the focus lens group. The microcontroller is provided for receiving a plurality of instructions, and using one of a plurality of predetermined speeds to control the motor to drive the focus lens group or the zoom lens group to perform a focus motion or a zoom motion according to the received instruction.

Preferably, the plurality of predetermined speeds include a first predetermined speed, a second predetermined speed and a third predetermined speed, and when the image capturing device is powered on and the microcontroller receives a power-on instruction, the microcontroller controls the motor at the first predetermined speed to drive the movements of the focus lens group to perform the focus motion, and after the focus motion is completed, the microcontroller adjusts the first predetermined speed to the second predetermined speed, and when the microcontroller receives a zoom instruction, the microcontroller controls the motor at the second predetermined speed to drive the movements of the zoom lens group and perform the zoom motion, and when the microcontroller receives an image capturing instruction, the microcontroller adjusts the second predetermined speed to the third predetermined speed and controls the motor at the third predetermined speed to drive the movements of the focus lens group and perform a focus motion.

Preferably, the first predetermined speed is greater than the second predetermined speed and the third predetermined speed, and the second predetermined speed is greater than the third predetermined speed.

Preferably, the lens actuating device of the present invention further comprises an image sensor, wherein the microcontroller controls the image sensor to capture the image after the microcontroller receives the image capturing instruction and uses the third predetermined speed to control the motor to drive the focus lens group to perform a focus motion.

Preferably, the motor is a DC motor.

To achieve the aforementioned objective, the present invention further provides a lens actuating method comprising the steps of: using a microcontroller to receive a power-on instruction and to control a motor at a first predetermined speed, such that the motor drives a focus lens group to perform a focus motion; adjusting the first predetermined speed to a second predetermined speed by the microcontroller, after the focus motion is completed; and using the second predetermined speed to control the motor, such that the motor drives a zoom lens group to perform a zoom motion if the microcontroller receives a zoom instruction, or adjusting the second predetermined speed to a third predetermined speed to control the motor, such that the motor drives the focus lens group to perform a focus motion if the microcontroller receives an image capturing instruction.

To achieve the aforementioned objective, the present invention further provides an image capturing device, comprising: a camera lens, including a focus lens group and a zoom lens group; an image sensor, for sensing an image; a motor, for driving the movements of the zoom lens group and the focus lens group respectively; and a microcontroller, electrically coupled to the image sensor and the motor, and when the image capturing device is powered on to execute a zoom function or an image capturing function, the microcontroller receives a different corresponding instruction, and controls the motor at one of a plurality of predetermined speeds according to the received instruction, such that the motor drives the focus lens group or the zoom lens group to perform a focus motion or a zoom motion, and then the image sensor captures the image.

Preferably, the plurality of predetermined speeds include a first predetermined speed, a second predetermined speed and a third predetermined speed; and when the image capturing device is powered on and the microcontroller receives a power-on instruction, the microcontroller controls the motor at the first predetermined speed to drive to drive the movements of the focus lens group to perform the focus motion, and after the focus motion is completed, the microcontroller adjusts the first predetermined speed to the second predetermined speed, and when the microcontroller receives a zoom instruction, the microcontroller uses the second predetermined speed to control the motor to drive the movements of the zoom lens group and perform the zoom motion, and when the microcontroller receives an image capturing instruction, the microcontroller adjusts the second predetermined speed to the third predetermined speed to control the motor to drive the movements of the focus lens group and perform a focus motion, and then the image sensor captures the image.

Preferably, the image capturing device of the present invention further comprises a power-on switch, a zoom setting key and a shutter key, and after the power-on switch is turned on, the microcontroller receives the power-on instruction; after the zoom setting key is pressed, the microcontroller receives the zoom instruction to perform the zoom function; and after the shutter key is pressed, the microcontroller receives the image capturing instruction to execute the image capturing function.

In summation, the image capturing device, the lens actuating device and the lens actuating method in accordance with the present invention can use different rotating speeds to control a single DC motor by the microcontroller to drive the movements of the zoom lens group and the focus lens group according to a user operating behavior, so as to complete the zoom and focus functions with better efficiency and improve the overall performance effectively.

DESCRIPTION OF THE PREFERRED EMBODIMENTS

The technical characteristics of the present invention will become apparent with the detailed description of the preferred embodiments accompanied with the illustration of related drawings as follows. It is noteworthy to point out that the drawings are provided for the purpose of illustrating the present invention, but they are not necessarily drawn according to the actual scale, or are not intended for limiting the scope of the invention.

Figure 1:
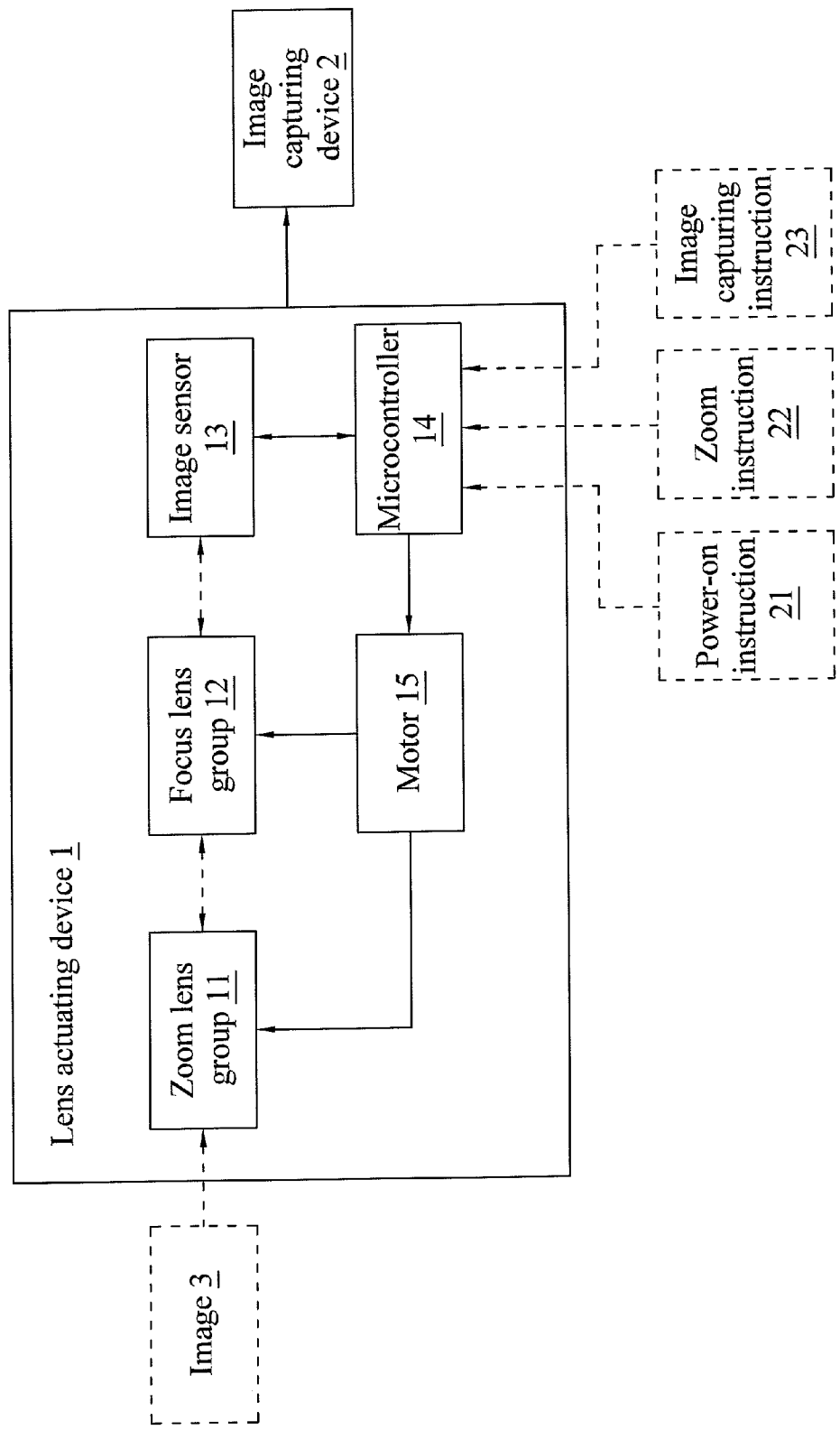
FIG. 1 is a schematic view of a lens actuating device of the present invention.

With reference to FIG. 1 for a schematic view of a lens actuating device of the present invention, the lens actuating device 1 comprises a zoom lens group 11, a focus lens group 12, an image sensor 13, a microcontroller 14 and a motor 15. The lens actuating device 1 is applied in an image capturing device 2 such as a digital camera, a Smartphone, or a single lens reflex camera. The image sensor 13 can be a charge coupled device (CCD) or a complementary metal oxide semiconductor (CMOS) sensor for sensing or capturing an image 3. The microcontroller 14 can be a micro control unit (MCU). The microcontroller 14 is electrically coupled to the image sensor 13 for controlling the operation of the motor 15. The zoom lens group 11 is installed between an object to be photographed and the image sensor 13, and the focus lens group 12 is installed between the zoom lens group 11 and the image sensor 13. The zoom lens group 11 is provided for adjusting the image sensor 13 to sense the focal length of an image 3, and the focus lens group 12 is provided for changing the focal point of the image 3. Wherein, the motor 15 used in the lens actuating device 1 of the present invention is a DC motor, and a single DC motor is mainly used for driving the movements of the zoom lens group 11 and the focus lens group 12. When the motor 15 drives the movements of the zoom lens group 11, the focus lens group 12 remains still; and when the motor 15 drives the movements of the focus lens group 12, the zoom lens group 11 remains still.

In the description above, when the microcontroller 14 receives different instructions, the microcontroller 14 use one of a plurality of predetermined speeds to control the operation of the motor 15 to drive the focus lens group 12 or the zoom lens group 11 to perform a focus motion or a zoom motion. More specifically, the plurality of predetermined speeds can be divided into a first predetermined speed, a second predetermined speed and a third predetermined speed. When the image capturing device 2 is powered on, the microcontroller 14 receives a power-on instruction 21, and the microcontroller 14 controls the operation of the motor 15 by the first predetermined speed, such that the motor 15 drives the movements of the focus lens group 12 and perform the focus motion. After the power-on and the focusing and positioning are completed, the microcontroller 14 adjusts the first predetermined speed to the second predetermined speed. If a user uses the image capturing device 2 to execute the zoom function, the microcontroller 14 receives a zoom instruction 22, and the microcontroller 14 controls the operation of the motor 15 by the second predetermined speed, such that the motor 15 drives the movements of the zoom lens group 11 and perform the zoom motion. If the user uses the image capturing device 2 to execute the zoom function or not to execute the zoom function, and execute an image capturing function, the microcontroller 14 receives an image capturing instruction 23, and the microcontroller 14 adjusts the second predetermined speed to the third predetermined speed to control the motor 15, such that the motor 15 drives the focus lens group 12 to perform a focus motion, and then the microcontroller 14 controls the image sensor 13 to capture the image 3. Wherein, the first predetermined speed is greater than the second predetermined speed and the third predetermined speed, and the second predetermined speed is greater than third predetermined speed. It is noteworthy to point out that the plurality of predetermined speeds that are divided into a first predetermined speed, a second predetermined speed and a third predetermined speed is just an example used for illustrating the invention only, and more predetermined speeds can be defined to control the operation of the motor 15. The relation between the first predetermined speed, the second predetermined speed and the third predetermined speed is also provided for the purpose of illustrating the present invention, but not intended for limiting the scope of the invention.

Figure 2:
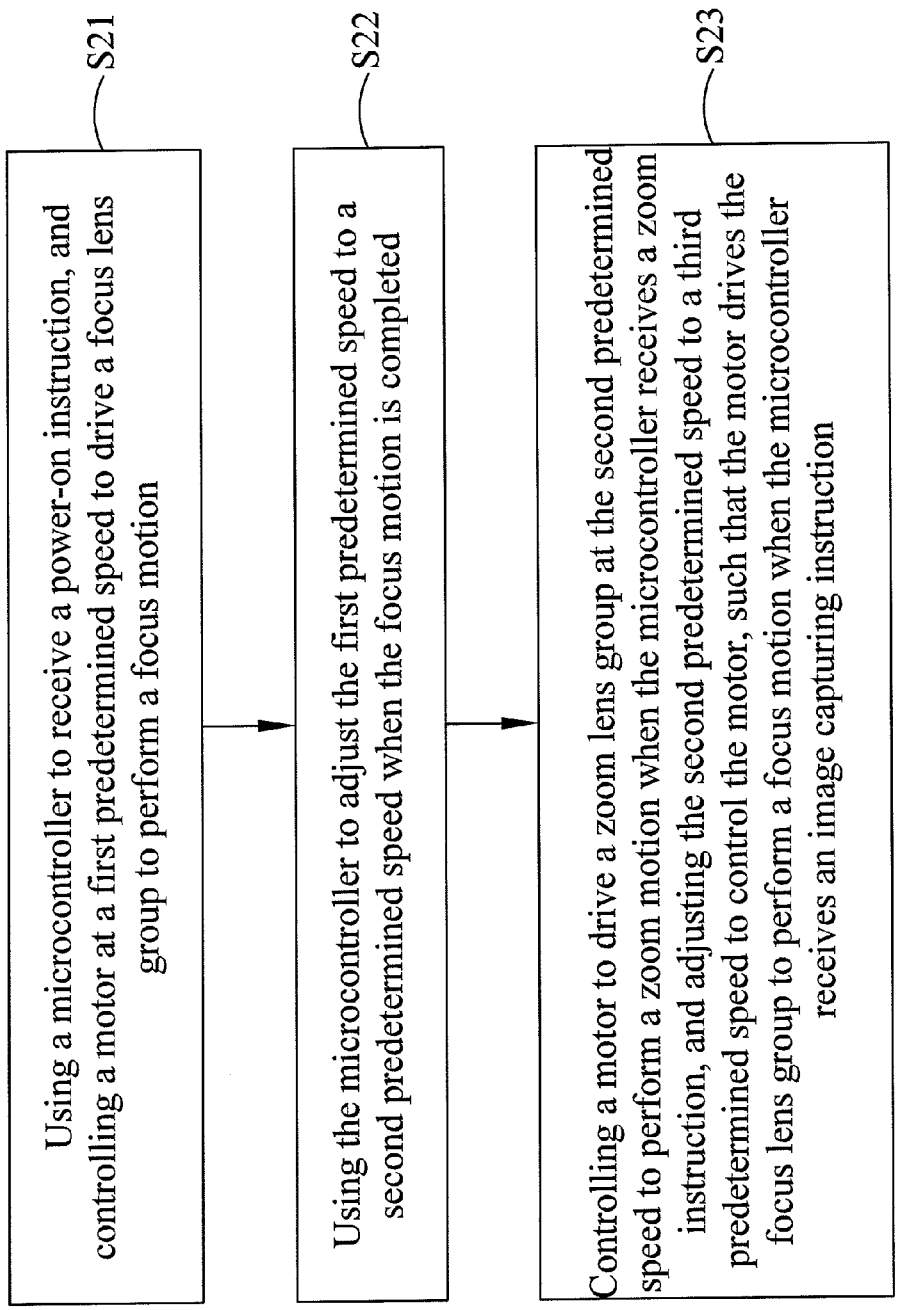
FIG. 2 is a flow chart of a lens actuating method of the present invention.

With reference to FIG. 2 for a flow chart of a lens actuating method of the present invention, the lens actuating method comprises the following steps:

S21: Using a microcontroller to receive a power-on instruction, and controlling a motor at the first predetermined speed to drive a focus lens group to perform a focus motion.

S22: Using the microcontroller to adjust the first predetermined speed to a second predetermined speed when the focus motion is completed.

S23: Controlling a motor to drive a zoom lens group at the second predetermined speed to perform a zoom motion when the microcontroller receives a zoom instruction, and adjust the second predetermined speed to a third predetermined speed to control the motor, such that the motor drives the focus lens group to perform a focus motion, when the microcontroller receives an image capturing instruction.

In the description above, when the microcontroller receives a power-on instruction, the microcontroller controls an image sensor to sense an image. When the microcontroller receives an image capturing instruction, the microcontroller controls the motor by the third predetermined speed to drive the focus lens group to perform a focus motion and further controls the image sensor to capture an image. Wherein, the first predetermined speed is preferably greater than the second predetermined speed and the third predetermined speed, and the second predetermined speed is preferably greater than the third predetermined speed. It is noteworthy to point out that the motor is a DC motor.

Figure 3:
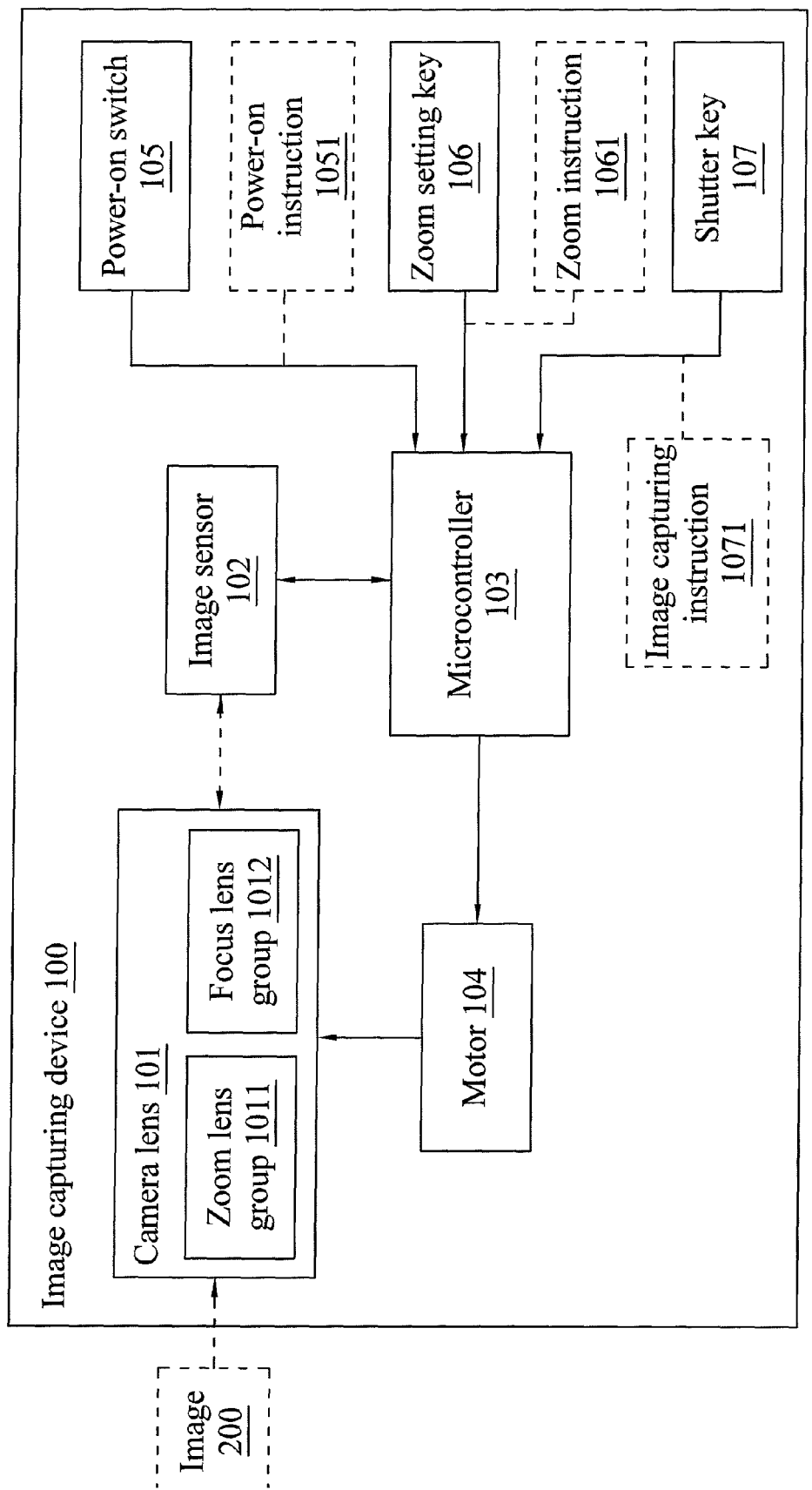
FIG. 3 is a schematic view of an image capturing device of the present invention.

With reference to FIG. 3 for a schematic view of an image capturing device of the present invention, the image capturing device 100 comprises a camera lens 101, an image sensor 102, a microcontroller 103 and a motor 104. The camera lens 101 includes a zoom lens group 1011 and a focus lens group 1012, and the motor 104 is preferably a DC motor. The microcontroller 103 is electrically coupled to the image sensor 102 for turning on the image sensor 102 to sense an object to be photographed and form an image 200, and the microcontroller 103 is provided for controlling the motor 104. The motor 104 drives the movements of the zoom lens group 1011 and the focus lens group 1012, such that the zoom lens group 1011 can be moved to adjust the focal length of the image 200, and the focus lens group 1012 can be moved to change the focal point of the image 200. The image capturing device 100 further comprises a power-on switch 105, a zoom setting key 106 and a shutter key 107. The power-on switch 105, the zoom setting key 106 and the shutter key 107 are electrically coupled to the microcontroller 103. The power-on switch 105 is provided for a user to press in order to power on the image capturing device 100. The zoom setting key 106 is provided for a user to press in order to execute the zoom function. The shutter key 107 is provided for a user to press in order to drive the image capturing device 100 to execute the image capturing function. Wherein, the image capturing device 100 can be a digital camera, a Smartphone or a single lens reflex camera.

In the description above, if the image capturing device 100 is powered on to execute a zoom function or an image capturing function, the microcontroller 103 will receive different instructions and control the motor 104 by one of a plurality of predetermined speeds to drive the focus lens group 1012 or the zoom lens group 1011 to perform a focus motion or a zoom motion according to the received instruction, and then the image sensor 102 captures an image 200.

More specifically, the plurality of predetermined speeds preferably include a first predetermined speed, a second predetermined speed and a third predetermined speed, and the first predetermined speed is preferably greater than second predetermined speed and a third predetermined speed, and the second predetermined speed is preferably greater than the third predetermined speed. Wherein, when a user presses the power-on switch 105 to power on the image capturing device 100, the microcontroller 103 receives a power-on instruction 1051. Now, the microcontroller 103 controls the motor 104 to rotate at a rotating speed equal to the first predetermined speed, so that the motor 104 drives the movements of the focus lens group 1012 and perform a focus motion. When the focusing and positioning of the power on are completed, the microcontroller 103 will adjust the first predetermined speed to the second predetermined speed. If the user presses the zoom setting key 106 to execute the zoom function, the microcontroller 103 will receive a zoom instruction 1061, and the microcontroller 103 controls the motor 104 at the second predetermined speed, such that the motor 104 drives the movements of the zoom lens group 1011 and perform the zoom motion. If the user does not press the zoom setting key 106 or has completed executing the zoom function and presses a shutter key 107 to drive the image capturing device 100 to execute an image capturing function, the microcontroller 103 will receive an image capturing instruction 1071 and adjust the second predetermined speed to the third predetermined speed to control the motor 104, such that the motor 104 drives the focus lens group 1012 to perform the focus motion and then the image sensor 102 captures the image 200. The foregoing preferred embodiment is provided for illustrating the present invention, and is not intended for limiting the scope of the invention.

Figure 4:
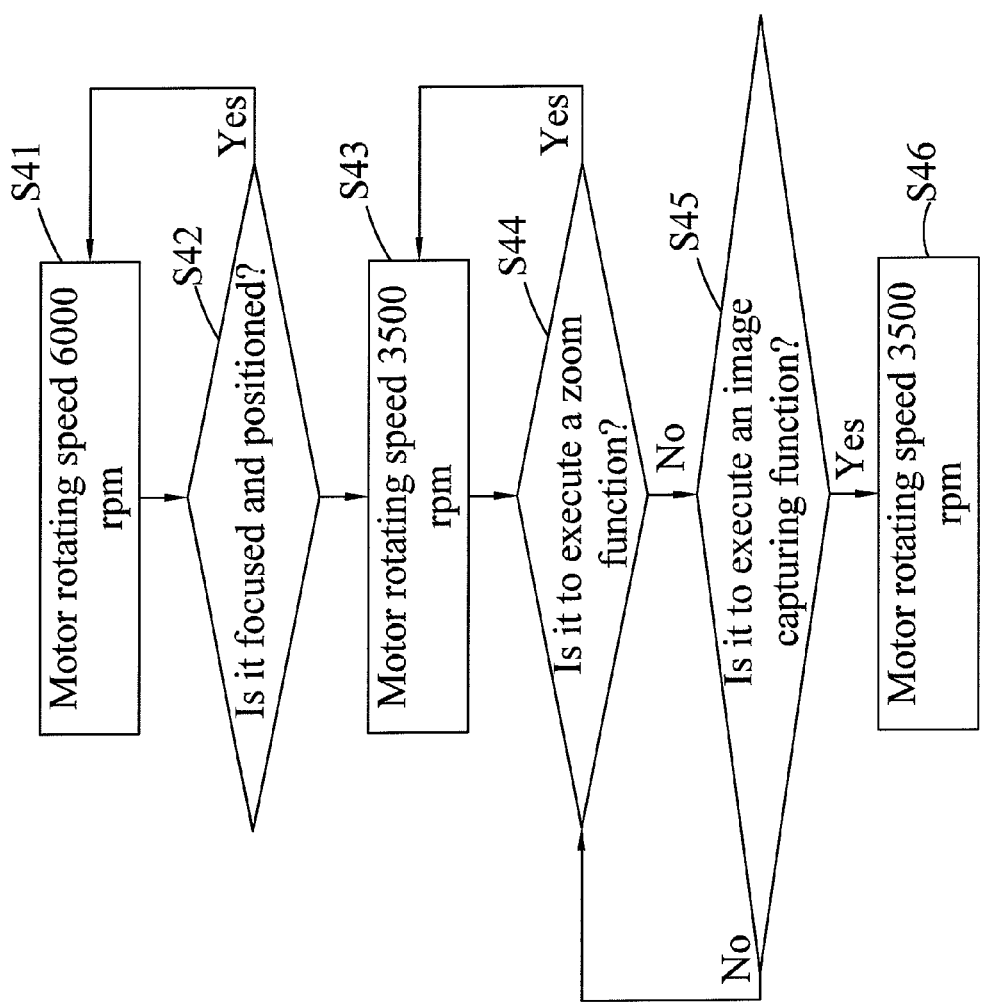
FIG. 4 is a flow chart of a lens actuating method in accordance with a preferred embodiment of the present invention.

With reference to FIG. 4 for a flow chart of a lens actuating method of a preferred embodiment of the present invention, the lens actuating method is applied in an image capturing device and comprises the following steps:

S41: When an image capturing device is powered on, and a microcontroller controls a motor to operate at a rotating speed of 6000 rpm, such that the motor drives the focus lens group to perform a focus motion. Wherein, the motor is a DC motor.

S42: The microcontroller determines whether a focusing and a positioning are completed; if yes, then go to the step S43, or else return to the step S41.

S43: When the focusing and positioning of the power on are completed, the microcontroller adjusts the rotating speed of the motor from 6000 rpm to 3500 rpm.

S44: The microcontroller determines whether the image capturing device is used by a user to execute a zoom function; if yes, then go to the step S43, so that the microcontroller controls the motor to operate at a rotating speed of 3500 rpm to drive the zoom lens group to perform the zoom motion, or else go to the step S45.

S45: The microcontroller determines whether the image capturing device is used by a user to execute an image capturing function; if yes, then go to the step S46, or else the image capturing device stands by or determines whether the user executes the zoom function again.

S46: When the image capturing device executes the image capturing function, the microcontroller adjusts the rotating speed from 3500 rpm to less than 2000 rpm to control the motor to drive the focus lens group to perform the focus motion again, and then completes capturing an image.

It is noteworthy to point out that the rotating speeds used in the preferred embodiments are provided for the purpose of illustrating the present invention, and is not intended for limiting the scope of the invention.

In summation of the description above, the image capturing device, the lens actuating device and the lens actuating method of the present invention use a single DC motor to control the zoom and focus motions, so that the present invention can change the rotating speed of the motor according to the user's using behavior to perform the zoom and focus functions at different rotating speeds, so as to improve the overall performance effectively.

What is claimed is:

1. A lens actuating device, applied in an image capturing device, comprising:

a focus lens group, for changing a focal point of an image;
a zoom lens group, for changing a focal length of the image;
a motor, for driving movements of the zoom lens group and the focus lens group respectively; and
a microcontroller, for receiving a plurality of instructions, and to control the motor to drive the focus lens group or the zoom lens group at one of a plurality of predetermined speeds to perform a focus motion or a zoom motion according to the received instructions, wherein the plurality of predetermined speeds includes a first predetermined speed, a second predetermined speed and a third predetermined speed, and when the image capturing device is powered on and the microcontroller receives a power-on instruction, the microcontroller controls the motor at the first predetermined speed to drive the movements of the focus lens group to perform the focus motion, and after the focus motion is completed, the microcontroller adjusts the first predetermined speed to the second predetermined speed, and when the microcontroller receives a zoom instruction, the microcontroller controls the motor at the second predetermined speed to drive the movements of the zoom lens group and perform a zoom motion, and when the microcontroller receives an image capturing instruction, the microcontroller adjusts the second predetermined speed to the third predetermined speed to control the motor to drive the movements of the focus lens group and perform the focus motion, and wherein the first predetermined speed is greater than the second predetermined speed and the third predetermined speed, and the second predetermined speed is greater than the third predetermined speed.

2. The lens actuating device of claim 1, further comprising an image sensor, wherein the microcontroller controls the image sensor to capture the image after the microcontroller receives the image capturing instruction and uses the third predetermined speed to control the motor to drive the focus lens group to perform the focus motion.

3. The lens actuating device of claim 1, wherein the motor is a DC motor.

4. A lens actuating method, comprising the steps of:
using a microcontroller to receive a power-on instruction and control a motor at a first predetermined speed, such that the motor drives a focus lens group to perform a focus motion;
adjusting the first predetermined speed to a second predetermined speed by the microcontroller, after the focus motion is completed; and
using the second predetermined speed to control the motor, such that the motor drives a zoom lens group to perform a zoom motion when the microcontroller receives a zoom instruction, and adjusting the second predetermined speed to a third predetermined speed to control the motor, such that the motor drives the focus lens group to perform the focus motion when the microcontroller receives an image capturing instruction, wherein the first predetermined speed is greater than the second predetermined speed and the third predetermined speed, and the second predetermined speed is greater than the third predetermined speed.

5. The lens actuating method of claim 4, further comprising the step of using the microcontroller to control an image sensor to sense an image, when the microcontroller receives the power-on instruction.

6. The lens actuating method of claim 5, further comprising the step of controlling the motor at the third predetermined speed by the microcontroller to drive the focus lens group to perform the focus motion, and then controlling the image sensor to capture the image by the microcontroller when the microcontroller receives the image capturing instruction.

7. The lens actuating method of claim 4, wherein the motor is a DC motor.

8. An image capturing device, comprising:
a camera lens, including a focus lens group and a zoom lens group;
an image sensor, for sensing an image;
a motor, for driving movements of the zoom lens group and the focus lens group respectively; and
a microcontroller, electrically coupled to the image sensor and the motor, and when the image capturing device is powered on to execute a zoom function or an image capturing function, the microcontroller receives a different corresponding instruction, and controls the motor at one of a plurality of predetermined speeds according to the received instruction, such that the motor drives the focus lens group or the zoom lens group to perform a focus motion or a zoom motion, and then the image sensor captures the image, wherein the plurality of predetermined speeds includes a first predetermined speed, a second predetermined speed and a third predetermined speed, and when the image capturing device is powered on and the microcontroller receives a power-on instruction, the microcontroller controls the motor at the first predetermined speed to drive the movements of the focus lens group to perform the focus motion, and after the focus motion is completed, the microcontroller adjusts the first predetermined speed to the second predetermined speed, and when the microcontroller receives a zoom instruction, the microcontroller uses the second predetermined speed to control the motor to drive the movements of the zoom lens group and perform a zoom motion, and when the microcontroller receives an image capturing instruction, the microcontroller adjusts the second predetermined speed to the third predetermined speed to control the motor to drive the movements of the focus lens group and perform the focus motion, and then the image sensor captured the image, and wherein the first predetermined speed is greater than the second predetermined speed and the third predetermined speed, and the second predetermined speed is greater than the third predetermined speed.

9. The image capturing device of claim 8, further comprising a power-on switch, a zoom setting key and a shutter key, and after the power-on switch is turned on, the microcontroller receives the power-on instruction; after the zoom setting key is pressed, the microcontroller receives the zoom instruction to perform the zoom function; and after the shutter key is pressed, the microcontroller receives the image capturing instruction to execute the image capturing function.

10. The image capturing device of claim 8, wherein the motor is a DC motor.

* * * * *